United States Patent
Eder et al.

(10) Patent No.: US 11,501,496 B2
(45) Date of Patent: Nov. 15, 2022

(54) NAVIGATION SYSTEM AND METHOD USING A BOUNDING VOLUME HIERARCHY

(71) Applicant: Sony interactive Entertainment Inc., Tokyo (JP)

(72) Inventors: Michael Eder, London (AU); Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/067,919

(22) Filed: Oct. 12, 2020

(65) Prior Publication Data

US 2021/0118230 A1    Apr. 22, 2021

(30) Foreign Application Priority Data

Oct. 18, 2019  (GB) .................................. 1915112.5
Sep. 17, 2020  (GB) .................................. 2014647.8

(51) Int. Cl.
   *G06T 19/00*   (2011.01)
   *G06T 15/06*   (2011.01)

(52) U.S. Cl.
   CPC ............ *G06T 19/003* (2013.01); *G06T 15/06* (2013.01); *G06T 2215/16* (2013.01)

(58) Field of Classification Search
   CPC .......................... G06T 17/005; G06T 19/003
   See application file for complete search history.

(56) References Cited

U.S. PATENT DOCUMENTS

2008/0088619 A1* 4/2008 Shearer ................. G06T 15/06
                                                                345/420
2008/0231628 A1* 9/2008 Shearer ................. G06T 15/50
                                                                345/419
2019/0017838 A1* 1/2019 Ryde ................... G05D 1/0246
2019/0057539 A1  2/2019 Stanard
2019/0180499 A1* 6/2019 Caulfield ........... G06K 9/00201
2020/0262427 A1* 8/2020 Taylor ................. G08G 5/0008

FOREIGN PATENT DOCUMENTS

CN    109960261 A    7/2019
WO    2018035507 A1  2/2018

OTHER PUBLICATIONS

Combined Search and Examination Report for corresponding GB Application No. GB2014647.8, 6 pages, dated Feb. 26, 2021.
Combined Search and Examination Report for corresponding GB Application No. GB1915112.5, 12 pages, dated Aug. 14, 2020.
Schwesinger Ulrich et al., "Fast collision detection through bounding volume hierarchies in workspace time space for sampling-based motion planners," IEEE International Conference on Robotics and Automation, 6 pages, Published 2015.

* cited by examiner

*Primary Examiner* — Ryan McCulley
(74) *Attorney, Agent, or Firm* — Matthew B. Dernier, Esq.

(57) ABSTRACT

A system for generating a path for navigating an environment, the system comprising a bounding volume hierarchy, BVH, generation unit operable to generate a BVH comprising a plurality of bounding volumes representing one or more objects in the environment, a BVH analysis unit operable to identify information about the geometry of the environment from the BVH, and a path planning unit operable to generate a path through the environment in dependence upon the identified geometry.

11 Claims, 6 Drawing Sheets

NAVIGATION SYSTEM AND METHOD USING A BOUNDING VOLUME HIERARCHY

BACKGROUND OF THE INVENTION

Field of the Invention

This disclosure relates to a navigation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Raytracing is a rendering technique that has received widespread interest in recent years for its ability to generate a high degree of visual realism. Raytracing is often utilised in simulations of a number of optical effects within an image, such as reflections, shadows, and chromatic aberrations.

This can be useful for any computer-based image generation process—for example, for special effects in movies and in generating images for computer games. While such techniques have been discussed and used for a relatively long time, it is only more recently that processing hardware has become suitably powerful so as to be able to implement raytracing techniques with an acceptably low latency for real-time applications or at least more extensive use within a piece of content.

Such techniques effectively aim to determine the visual properties of objects within a scene by tracing, from the camera, a ray for each pixel in the scene. Of course, this is a rather computationally intensive process—a large number of pixels are expected to be used for displaying a scene, and this may lead to a large number of calculations even for simpler scenes (such as those with few reflections and the like). In view of this, scanline rendering and other rendering methods have generally been preferred for rendering where the latency is considered to be important despite the lower image quality.

One technique that seeks to improve the rendering times associated with raytracing based methods is the use of bounding volumes to represent groups of objects. The use of bounding volumes is advantageous in that a group of objects may be tested for intersections by rays together, rather than on a per-object basis. This can mean that the number of intersection tests is reduced, as well as the calculations for each being simplified by the use of a simplified shape (such as a box or sphere) that is representative of the objects. While in principle advantageous, however, the challenge of defining an appropriate bounding volume structure may be problematic.

Raytracing, as a technique that can increase the perceived realism of generated video content, is of particular interest for virtual reality (VR) applications. In such applications, it is of course desirable to increase the realism of the provided visuals so as to improve the sense of immersion that is experienced by a viewer of the content—such as the user of a head-mountable display device (HMD). However, VR applications are particularly sensitive to long rendering times and as a result raytracing techniques are not widely used in these contexts.

It is therefore desirable to implement a raytracing algorithm in a manner that allows a realistic image to be generated without increasing the latency of the image rendering process to an undesirable level.

It is in the context of the above problems that the present disclosure arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
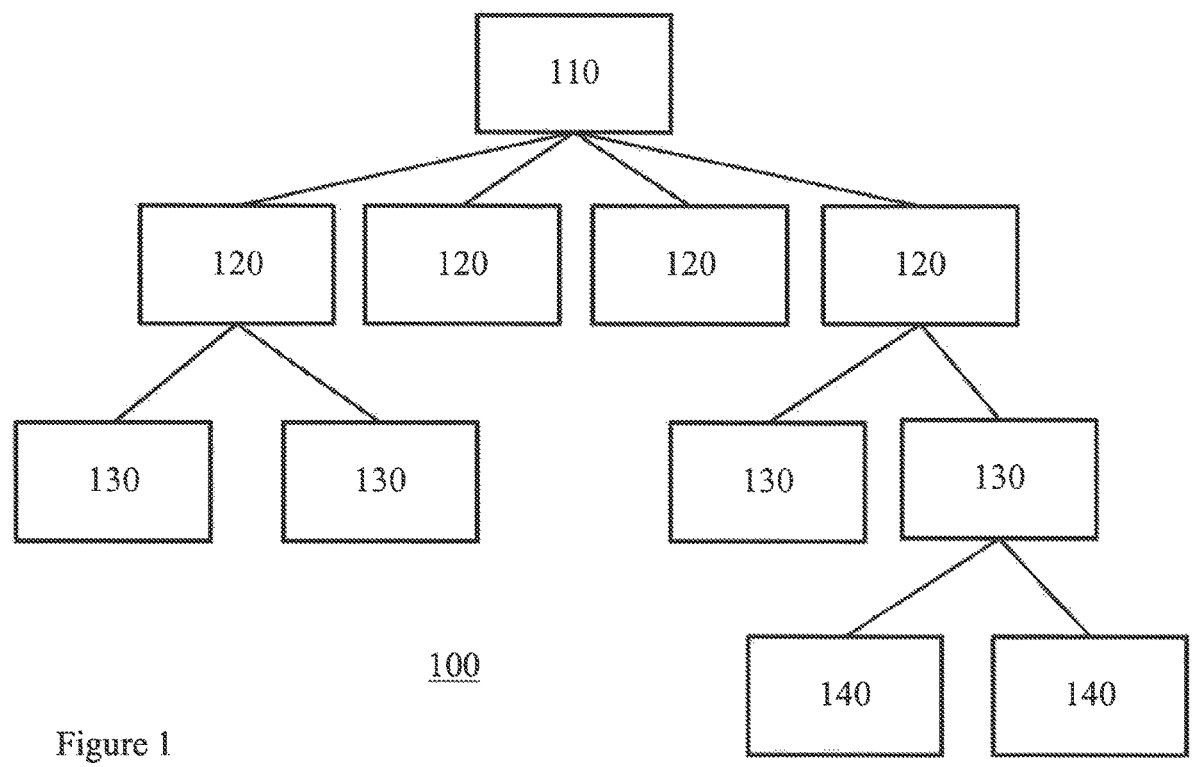
FIG. 1 schematically illustrates a bounding volume hierarchy.

Referring now to the drawings, wherein like reference numerals designate identical or corresponding parts throughout the several views, embodiments of the present disclosure are discussed.

The present disclosure relates to a system and method by which a bounding volume hierarchy (BVH) is used to generate information about the ability of an object to move through and environment. This differs from the traditional use of BVHs, in which they are used to represent objects in an ordered manner so as to enable raytracing (that is, graphics rendering) techniques to be performed more efficiently.

FIG. 1 schematically illustrates a simple example of a BVH; in this example, each box (bounding volume) represents one or more objects at a given level of detail. Each of the boxes is included in the box above it in the hierarchy—for example, the box 110 comprises information about all of objects in the environment, while each of the boxes 120 comprise a subset of the objects. These subsets may be determined in any suitable manner, although it is often considered that methods by which objects that are close to each other within an environment are grouped together and represented by the same bounding volume are preferable.

The level of detail for each level can be determined in any suitable fashion, and the BVH may have a maximum level of detail that is defined. For example, the BVH may terminate with bounding volumes representing groups of objects—this would lead to a coarse representation, but one that is reduced in size and may be traversed very quickly. Alternatively, the BVH may terminate with bounding volumes representing portions of objects—while this offers a finer approximation of the objects, of course this provides a BVH that is larger and may take longer to traverse. The BVH may be defined so as to comprise elements of both—such that some objects have a finer/coarser representation than others.

BVHs can be generated in a number of ways, each with its own benefits and drawbacks. For example, a top-down approach can be taken in which the bounding volumes are defined beginning with the largest sets possible. That is, the input (such as the set of objects within an environment, or a representation of those objects) is divided into two or more subsets that are each then subdivided—that is, bounding volumes are generated beginning with box 110, and proceeding to boxes 120 and so on. While this represents a fast implementation, it often results in a BVH that is rather inefficient, which can result in a larger size overall or a reduced ease of navigation.

An alternative method is that of the bottom-up approach. In this approach, the bounding volumes are defined beginning with the smallest volumes in the BVH. In the example of FIG. 1, this would mean that bounding volumes 140 are defined first, before progressing upwards to bounding volumes 130. While this can generally produce better (that is, more efficient) BVHs than the top-down approach, it can be more challenging to implement in an effective manner.

Each of these methods require information about all of the objects to be available before the BVH can be generated; this is of course acceptable in many applications, but in others it may be preferred that a BVH is able to be generated on-the-fly.

A third approach that may be considered is that of insertion methods. These may be performed on-the-fly, and they are performed by inserting objects into the bounding volumes of a BVH on a per-object basis. This means that only information about that object is necessary at the time of insertion. Insertion approaches cover a wide range of related methods in which the placement of the object is determined in a manner that identifies an optimal or suitable placement. For example, a function may be defined that evaluates the impact (in terms of size or navigability or the like) of an insertion upon the BVH, with the insertion being performed in a manner that minimises or otherwise reduces the impact upon the BVH.

Of course, any other suitable approaches may be considered compatible with the teachings of the present disclosure, rather than being limited to those discussed above.

Any suitable input data may be represented using a BVH and associated bounding volumes. For example, video games may provide a suitable source of input data for generating such a structure—in this case, the input information may be data about the virtual objects that defines their respective dimensions and locations. Similarly, information describing a real environment could be used as an information source—for example, information may be generated from images of a real environment and the objects within the environment, and this information can be used to generate a BVH that may be used to render images of that environment.

Figure 2:
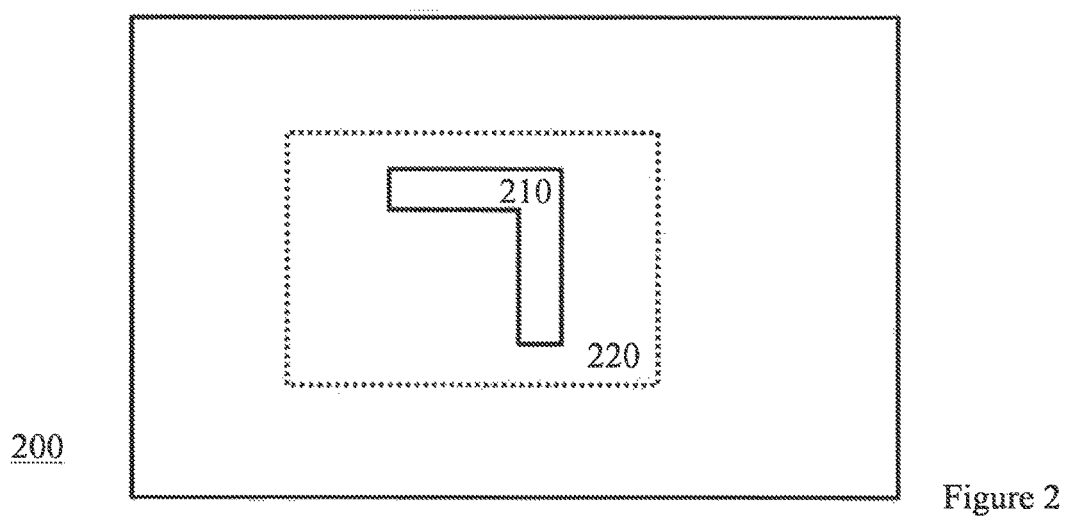
FIG. 2 schematically illustrates a bounding volume.
Figure 3:
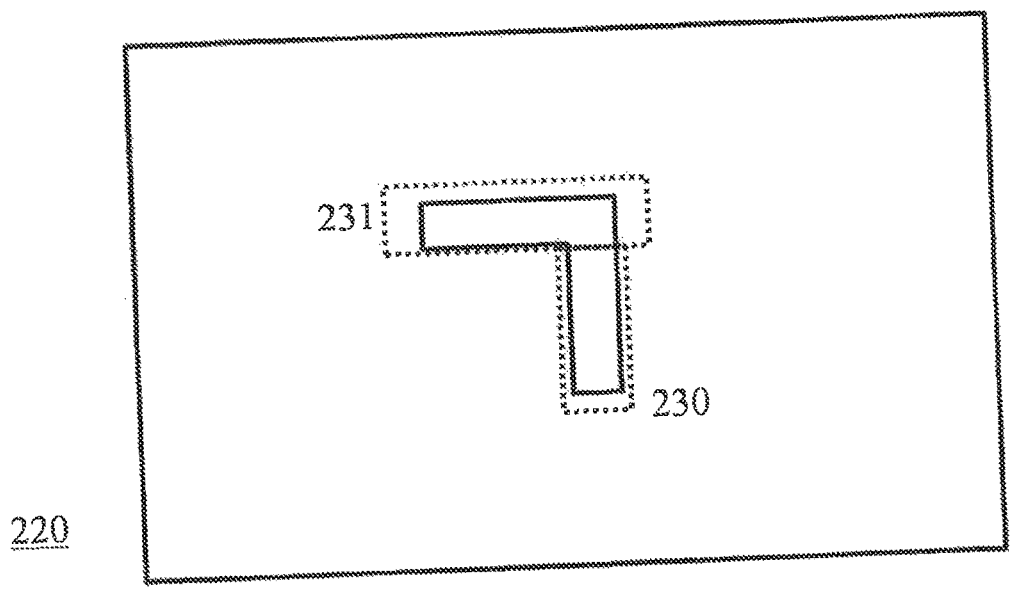
FIG. 3 schematically illustrates a plurality of bounding volumes.

FIGS. 2 and 3 schematically illustrate the use of bounding volumes in raytracing algorithms.

FIG. 2 schematically illustrates a viewport 200 in which rays are to be traced—this can be a camera view within a virtual environment to be presented to a viewer, for example. The scene comprises an object 210, which is enclosed by a bounding volume 220. Rather than testing intersections for each ray with each of the polygons that make up the object 210, which could be a rather large number, intersections are only tested with respect to the bounding volume 220. Of course, any rays that do not intersect the bounding volume 220 will not intersect the polygons that form the object 210—although of course rays may intersect the bounding volume 220 that will not intersect the polygons forming the object 210.

For example, if one hundred rays were to be tested for intersections, only one hundred tests would be required at this stage as there is a single object (the bounding volume 220) to test for each ray—rather than one hundred multiplied by the number of polygons making up the object 210.

FIG. 3 shows an enlarged version of the bounding volume 220, with smaller bounding volumes 230 and 231 used to represent the object 210. Intersections of the bounding volumes 230 and 231 can be tested for each of the rays that were found to intersect the bounding volume 220, to obtain a finer approximation of the visual appearance of the object 210.

If, for example, it were found that only ten rays intersected the bounding volume 220, this stage would require thirty tests (that is, a test for each ray with each bounding volume). This is again a very small amount relative to the testing of one hundred multiplied by the number of polygons making up the object 210 as noted above. It is therefore apparent that the falling number of rays to be considered for intersection is sufficient to offset the increasing number of bounding volumes to be considered, such that overall the total number of intersections to be tested is lower than the amount required if no bounding volumes are defined and no BVH is utilised.

In a practical implementation these volumes may be divided further until the surfaces of the object 210 are represented with a suitable level of precision for the application—such as when the bounding volumes and the polygons (primitives) representing the object occupy a similar display area, at which point the polygons may be used instead.

In these examples, the bounding volume 220 may be considered to be a higher level in the BVH than the bounding volumes 230, 231—for instance, the bounding volume 220 may correspond to a volume such as 120 of FIG. 1, while the smaller bounding volumes 230, 231 may correspond to volumes such as 130 of FIG. 1.

It is apparent from these Figures that the number of calculations that are to be performed in a raytracing method may be reduced significantly with the use of bounding volumes and BVHs; this is because the number of intersections that are to be evaluated may be reduced significantly.

In the present disclosure, as noted above, the use of a BVH structure is considered in the context of path planning within an environment. This may be appropriate in that the BVH comprises information that is indicative of the geometry of an environment, even if the purpose of the BVH generation is related to the appearance of the objects within the environment. Path planning here is taken to mean the process of identifying, for one or more objects or elements, a route that is to be taken through a real or virtual environment. For example, this may include the determination of a desirable route for a robot to take through a real environment, or for a computer-controlled character in a game to take through a virtual environment—or of course a mix between the two in the case of augmented reality (AR) applications.

It is common in computer games, and a number of other applications, to utilise a navigation mesh for path finding. A navigation mesh is a separate data structure that may be provided that corresponds to a particular environment, such as an in-game level map. The mesh comprises a number of polygons that define areas of the environment which can be used for movement by an object (such as a player's avatar, or a computer-controlled opponent).

Pathfinding using such a mesh is considered to be rather trivial, as it reduces the three-dimensional environment to a two-dimensional geometry that can be easily searched. In addition to this, the meshes may be created automatically after the environment has been created—the implementation burden is rather small as a result. The use of navigation meshes is therefore considered to be a very attractive option.

However, as discussed above the present disclosure considers an alternative approach to path planning. In this approach, the BVH that is defined for rendering the environment may be repurposed to provide information to enable paths within the environment to be generated. This may be advantageous in that the processing efficiency may be improved, as well as potentially reducing the amount of data that is stored for an environment (given that a single BVH may comprise environmental and rendering data). Benefits may also be derived from the fact that many hardware elements, such as graphics cards, provide in-built optimised support for raytracing and BVH traversal; by using a related process for navigation, it can be possible to take advantage of this in-built support.

Figure 4:
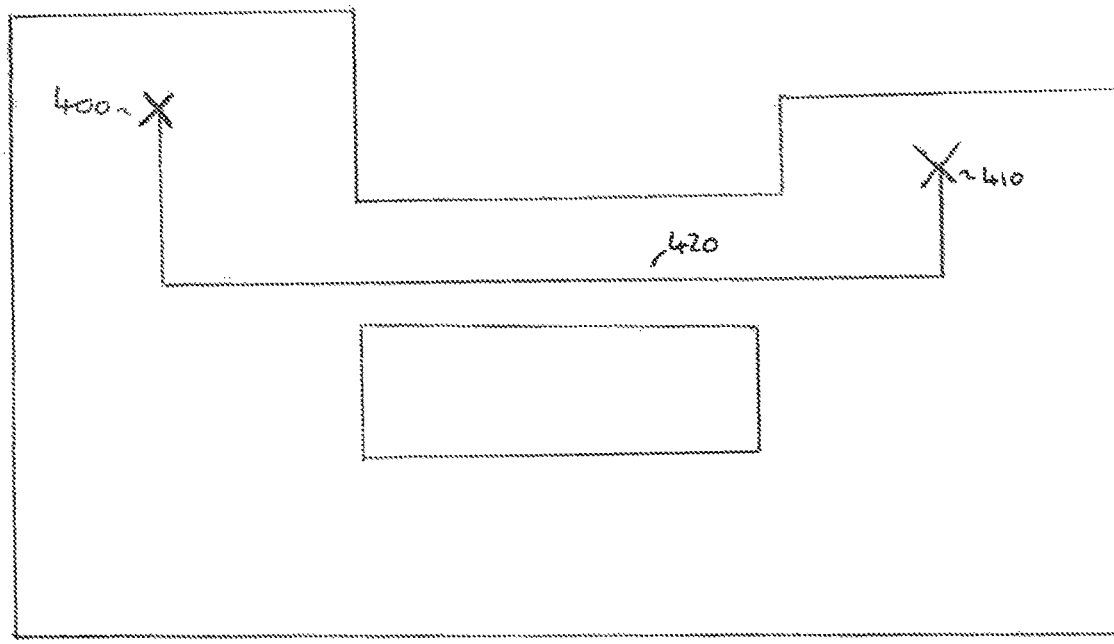
FIG. 4 schematically illustrates a path in an environment.

FIG. 4 schematically illustrates a simple example of a path that is to be planned. In this Figure a start position 400 is shown, with a destination 410 and a path 420. The presently discussed method relates to the determination of the path 420 using a BVH, given the initial and final locations (start 400, destination 410). Of course, the path must take a non-direct route given that the environmental features must be navigated around—there is no straight line path possible, as the start 400 and destination 410 are not visible to each other. Such a path planning method may be implemented in a number of ways, a selection of which is discussed below.

Figure 5:
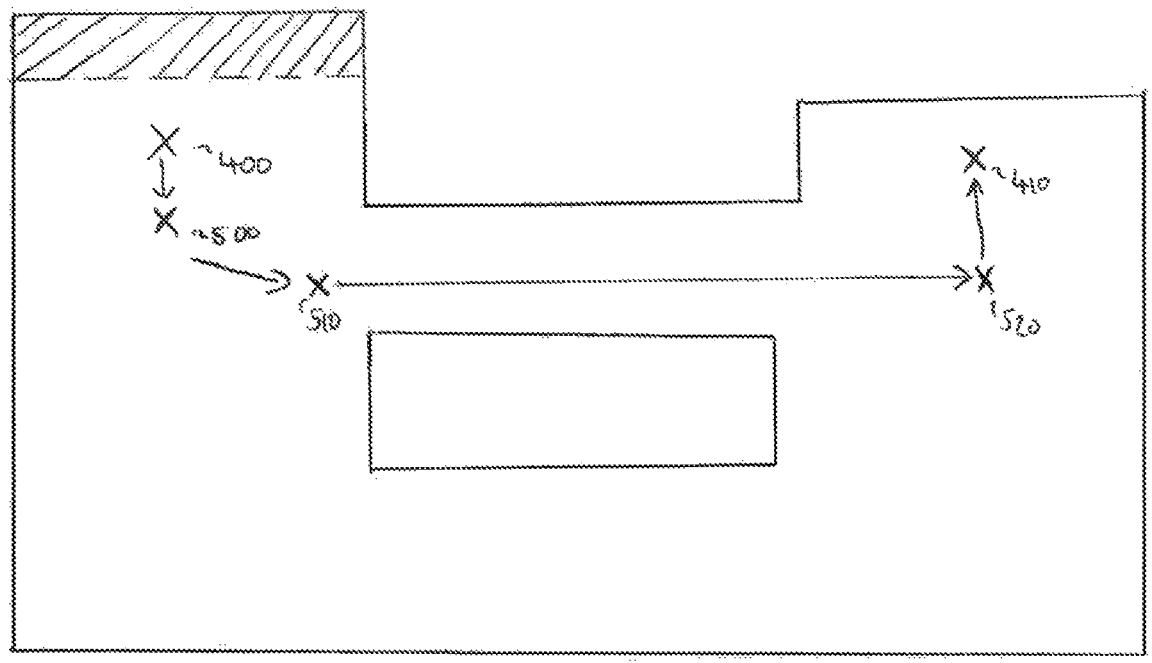
FIG. 5 schematically illustrates a path planning method.

In a first example, the BVH for an environment is used in an iterative manner such that possible paths are evaluated based upon the position of the object that is to follow the path within the environment. FIG. 5 schematically illustrates such a method.

In the example of FIG. 5, the navigating object begins at the position 400. Using the BVH and a raytracing approach, it can be identified that the position 400 is in a dead end—and therefore the object should not move further into the dead end. This can be determined using a high-level search with the BVH, such that very large bounding volumes (such as at the level 120 of FIG. 1) may be considered. By selecting rays in such a manner that a large number are not required for an initial assessment of the viability of a route, a culling of undesirable routes (such as those which lead to dead ends) can be performed cheaply.

Given that a dead end has been identified, the navigating object moves from position 400 to position 500. The distance that is moved by the object may be selected freely, of course—this may be a single step (or other unit of motion), a distance determined in dependence upon one or more features of the environment, or any other distance.

Similarly, the direction of the object motion may be determined in any suitable manner—in this case, for example, it could be determined that the path should remain in a relatively central position between the confining walls to either side, or that the movement should be perpendicular to the rear wall. However, in some embodiments it is considered just as suitable that any other direction could be selected—indeed, the direction could even be selected at random, rather than being dependent on any environmental or object-based criteria.

For example, in the example of FIG. 5, the entrance to the passage through which the path will pass may be identified from the initial analysis at the position 400—and the position 500 is selected so as to be a position at which it is expected that more information about the passage can be derived (for example, by moving the passage into the object's line of sight). Here, line of sight may refer to the environment surrounding the object, such as all elements not hidden by occlusions, rather than necessarily being limited to a portion of the environment that is actually being viewed by that object.

From the position 500, there are of course a number of possible options for movement. The path could continue on in its current direction (that is, towards the bottom of the Figure), or it could proceed into the passage. The outcome of this decision may be determined in accordance with any suitable criteria; again, this could be a deterministic approach or a random (weighted, or non-weighted) decision.

In the present example it is shown that the path proceeds from position 500 to position 510, at the entrance to the passage. Such a determination of the path direction may be made using knowledge of where the destination is—such that when given a choice, the path will tend to move in the direction that most closely relates to the direction of the destination in the environment. Alternatively, the path could be defined so as to move to a position where more information can be obtained. That is, from the position 510 more information can be determined about the passage (such as whether it is a dead end, or leads to another area), without eliminating or otherwise complicating the possibility of proceeding in an alternative direction (such as moving towards the bottom of the Figure).

From the position 510, the path proceeds to position 520. The distance between these positions is larger than that between 500 and 510; this distance may be determined in view of the fact that it can be determined that there are no intermediate options for paths to be considered, for example. That is, given that the passage has no breaks (such as side passages) in it the only options are to proceed to the end or turn around.

From the position 520, the destination (that is, position 410) can be seen—and therefore the path can proceed directly to this point without further consideration.

Of course, this represents a simplified example—in practice, the navigation may be more complex and may involve a characterisation of the surfaces (such as identifying traps or destroyable walls) so as to determine a suitable path. Information about such features may be determined in any suitable fashion—for example, the information could be encoded in the BVH using a bit field. Alternatively, the path planning may be performed with a view to these constraints (such as particular object, such as enemy and trap, avoidance) in mind—or multiple paths may be planned and a particular path is selected after evaluation by a game engine or the like to determine the suitability of the path.

Figure 6:
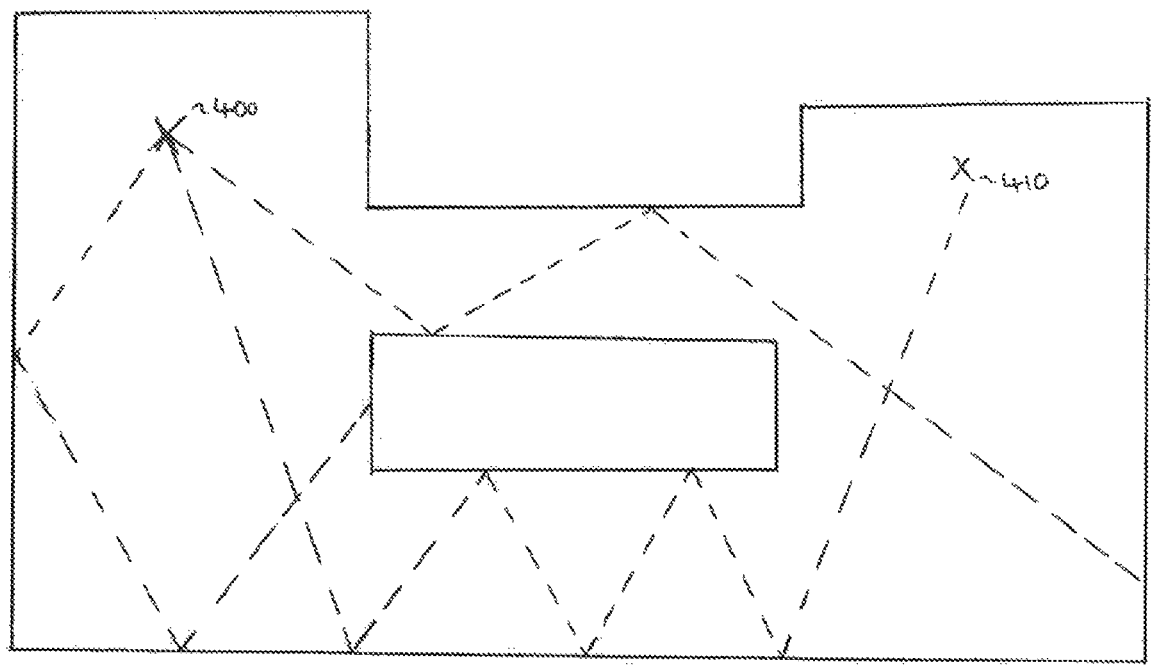
FIG. 6 schematically illustrates an alternative path planning method.

FIG. 6 schematically illustrates an alternative approach to path planning using a BVH. In this approach, a selection of rays is each traced within the environment with a predetermined number of reflections. Each of the rays is intended to represent a potential path, with the rays being evaluated for their suitability using a preferred metric.

For example, a binary approach can be taken in which if a ray does not intersect a bounding volume at the destination position 410, it is assigned a score of zero, while if a ray does intersect that bounding volume is assigned a score of one. Alternatively, such an approach could be modified so as to scale the assigned score for a successful path in dependence upon the path length or number of reflections before intersection—for instance, a long path could be assigned a score of one half, while a shorter path could be assigned a score of 2. In some embodiments a score may instead (or also) be assigned in consideration of the closest point on the path to the destination—that way 'near misses' (that is, almost successful paths) may be scored higher than those paths which are nowhere near successful.

The rays shown here are purely exemplary, illustrating differing levels of success and differing numbers of reflections. While the shown paths may not be the same as that which would be selected in the other methods discussed, of course given a suitable number of rays it is considered that the same solution (or an approximation of that solution) would be reached.

Of course, in the case that the destination does not correspond to an object, this may require that a bounding volume is defined that has no corresponding physical characteristics—effectively an empty box. Of course, such a volume should be able to be identified so as to be ignored by rendering calculations—for example, a flag could be provided that indicates whether a volume is for path finding only. Alternatively, it could simply be the case that an object is defined for display at the destination, such as a visible checkpoint or the like.

In the example of FIG. 6, the path planning method may be updated on the fly. For example, after a predetermined travel distance or time the same calculations may be performed again so as to determine if a new, and better, path is able to be identified.

In this example, the path is defined so as to rely on reflections and therefore necessarily involves collisions with surfaces in the environments. It is considered that a modification may be applied to the selected path so as to reduce the frequency of collisions or remove them altogether. For example, this could be implemented using a simple rule such as 'maintain a minimum distance from objects in the environment'; alternatively, or in addition, an average direction of multiple parts of the path could be calculated and used to find a straighter path.

While such methods may not lead to the most efficient path being determined, they may lead to the finding of a path that appears more natural (that is, less scripted)—this may be particularly suitable for scenarios in which the moving object is not familiar with the environment, or is intended to appear to not be familiar with the environment. In addition to this, the path planning may be less uniform, particularly if random elements are involved, and as such the diversity of movement within content may be improved.

A third method that may be considered is that of using the BVH as a proxy for a map. That is, by considering the size and location of the bounding volumes that are defined in the BVH it may be possible to generate a low-resolution map of at least a portion of the environment. For example, processing could be performed to place representations of the bounding volumes onto a two-dimensional plane, with paths being generated so as to utilise the areas of the plane that are not obstructed by the bounding volume representations.

Figure 7:
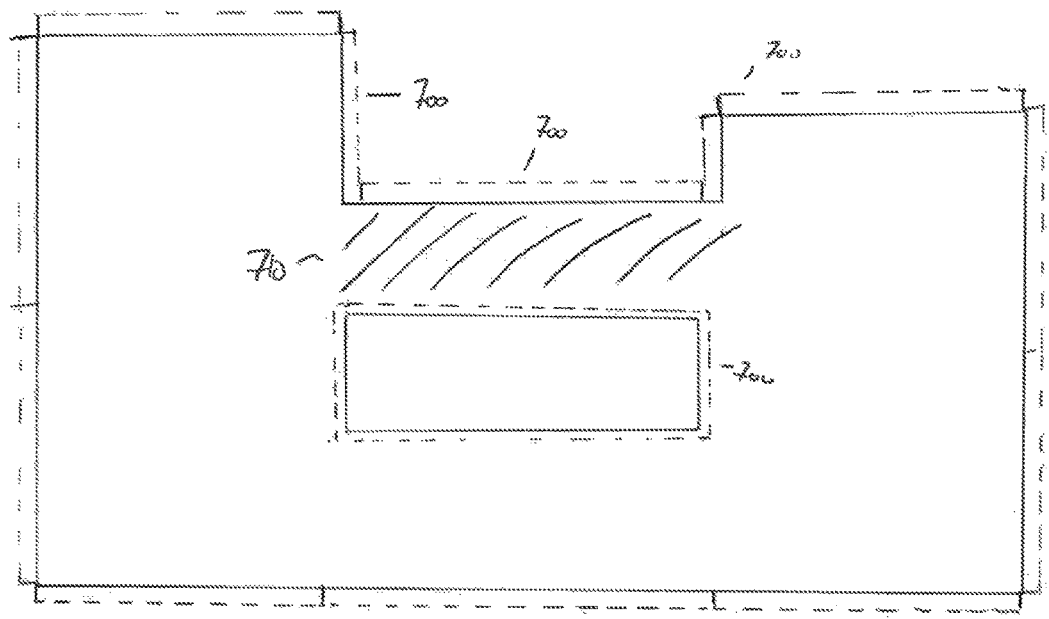
FIG. 7 schematically illustrates a map generated for path planning.

FIG. 7 schematically illustrates an example of such a map; each of the bounding volumes 700 (as denoted by dashed lines) represents a portion of the surfaces/objects within the environment. While these bounding volumes may not exactly correspond to the surfaces being represented, the approximation should be sufficient for path planning purposes given that selected paths are often significantly wider than the navigating objects (for example, corridors being wide enough for multiple people side-by-side, rather than being a squeeze for a single person).

Of course, the bounding volumes 700 shown in this Figure are exaggerated for clarity—it is expected that the approximation of the surface is much closer in a practical implementation (especially for regular shapes, such as walls).

For example, in FIG. 7 empty space between bounding volumes that define the passageway is indicated by the hatching 710. Once such spaces have been identified using the bounding volumes, any suitable path planning method may be performed—for example, a trial-and-error approach to identify a short route.

Of course, any of the above examples could be equally applied to both real environments and virtual environments, and even environments such as in AR applications which are considered to comprise a mixture of real and virtual elements. While the source of data in each application may be different (such as processed image data versus computer-generated environment data), the techniques may be transferrable.

A number of modifications to the above examples may be considered so as to improve the path planning efficiency and/or effectiveness, for instance.

For example, in the context of FIG. 6, the bounding volume corresponding to the destination position 410 may be varied in size such that as the navigating object approaches the destination the volume becomes smaller. This may be implemented by modifying the bounding volume size, or by using a different level of the BVH as appropriate. This may be advantageous in that the larger volume may be easier to 'hit' (that is, a path may be more likely to intercept the volume)—but the ability of the object to navigate to a precise point is compromised. By reducing the bounding volume size as the object becomes closer, the precision of the destination position may be increased without a substantial decrease in the ability to identify a successful path.

The described methods may be able to utilise bounding volumes of a particular level of a BVH as appropriate; for example, higher levels (corresponding to coarser bounding volumes) may be used when the precision required by a method is low, while lower levels (corresponding to more precise bounding volumes) may be used in the opposite case. The selection of a BVH level may be performed in determination upon any number of criteria.

For example, the complexity or size of the environment may be one of those criteria. In one example of this, the number of bounding volumes to be considered when path planning may be fixed (either as a single value, a threshold, or a range, for example) which leads to using higher-level bounding volumes in more complex environments (as each bounding volume must represent a greater number of objects/surfaces). This can be advantageous in that the path planning time may be made more consistent, for example, while increasing the precision of the path planning when the environment is less complex.

Other criteria that may be considered may be derived from the parameters of the path finding method itself. For example, a path planning process which is based on line of sight (such as that discussed with reference to FIG. 5) may be suitable for use with lower level bounding volumes given that the number of bounding volumes considered at any time is reduced (as it is based on line of sight, and not the whole environment). This means that the precision may be increased to take advantage of the reduction in processing associated with considering fewer bounding volumes.

Similarly, the method discussed with reference to FIG. 6 may be more suited to an embodiment in which higher-level bounding volumes are used given that the number of reflections (and therefore number of calculations) is likely to be high.

Of course, the same BVH level need not be used for each of the objects/surfaces within an environment; for example, the bounding volume that is to be used may be selected on a per-object/group basis, and/or a per-bounding volume basis. For instance, objects or surfaces may be given a varying priority or the like so as to indicate their suitability for representation using higher or lower level bounding volumes. For example, objects that define a narrow gap within the environment may be assigned a higher priority as the path planning may be caused to fail if the path between the objects is not able to be identified. Similarly, objects which belong to a bounding volume that provides a particularly coarse representation of those objects may also be determined to be high priority.

It may be advantageous in some cases to modify the BVH structure or otherwise adapt it to the dual-use that is considered in the present disclosure.

For instance, a bitmask may be applied to the BVH so as to be able to indicate which bounding volumes or BVH levels are considered to be suitable for use in path planning. That is, a flag may be assigned to each BVH level and/or bounding volume such that a first value indicates use for raytracing, and a second value indicates use for path planning (or both path planning and raytracing). In some cases, it is considered that a third value may be provided such that the values indicate use for raytracing, path planning, or both.

Figure 8:
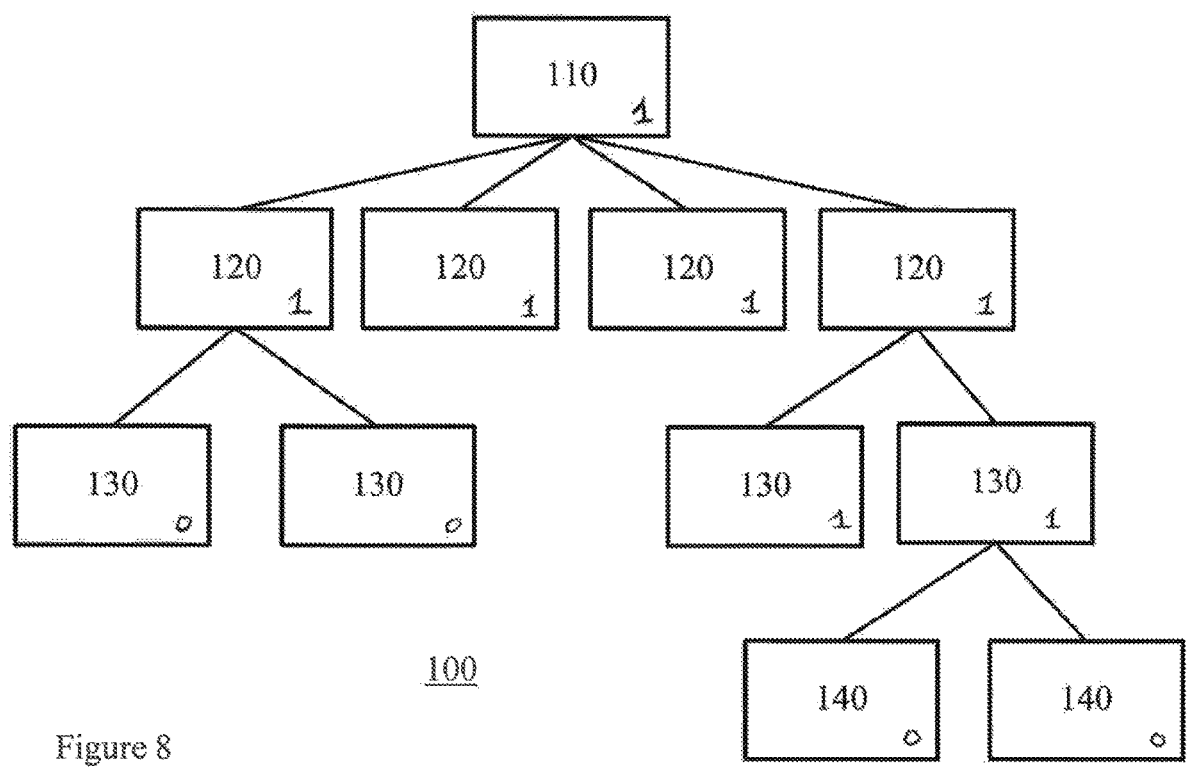
FIG. 8 schematically illustrates a BVH structure with a bitmask value.

FIG. 8 schematically illustrates an example of such a structure, based upon the BVH 100 shown in FIG. 1, with values being assigned to each of the bounding volumes present in the BVH 100.

In this Figure, bounding volume 110 is assigned a value of '1'; this indicates that the bounding volume 110 is able to be used for both path planning and raytracing. Similarly, bounding volumes 120 are also assigned the same value. The first two of the bounding volumes 130 are assigned a value of '0', indicating their use for rendering only, while the latter two of the bounding volumes 130 are assigned a value of '1'. This demonstrates that the values need not be assigned in a symmetric or uniform fashion, as discussed above. The bounding volumes 140 are also assigned a value of '0'.

Figure 9:
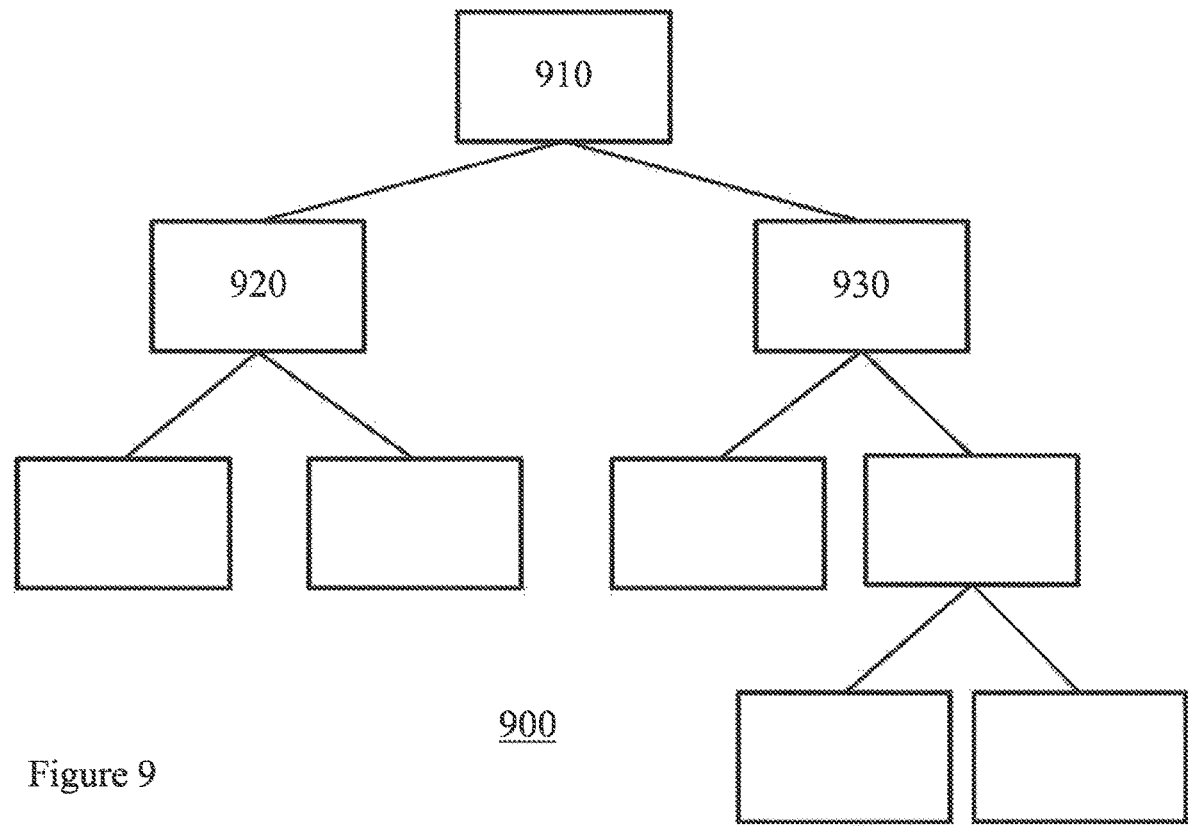
FIG. 9 schematically illustrates an alternative BVH structure.

FIG. 9 schematically illustrates an alternative (modified) BVH structure that may be utilised in embodiments of the present disclosure.

In this Figure, the BVH 900 comprises two distinct branches stemming from the bounding volume 910. The first, which has a highest level of bounding volume 920, may be dedicated to path planning while the second, which has a highest level of bounding volume 930, may be dedicated to raytracing. While this may result in a duplication or overlap of bounding volume data, the division of the BVH into distinct branches may improve the BVH traversal times and therefore result in an increased efficiency. Of course, each of the branches may be configured as appropriate and may not be symmetric—the branch for use with raytracing may comprise a greater number of bounding volumes and BVH levels, for instance, in view of the fact that a higher level of precision may be desired for such applications.

Of course, rather than being configured as two separate branches, a pair of separate BVHs may be provided—one for path planning, and one for raytracing.

While there is discussion above that relates to the use of only a portion of the raytracing BVH, or the use of a separate BVH, for path planning, it should be understood that this is not a requirement of the disclosed methods. Instead, the full BVH may be used for both raytracing and path planning methods as appropriate.

Whatever the configuration of the BVHs that is selected, it is considered that it may be advantageous to reuse traversal results between the two methods (that is, reusing a BVH traversal from raytracing for path planning, or reusing a BVH traversal from path planning for raytracing). This may increase the processing speed for the two processes when considered in combination.

Figure 10:
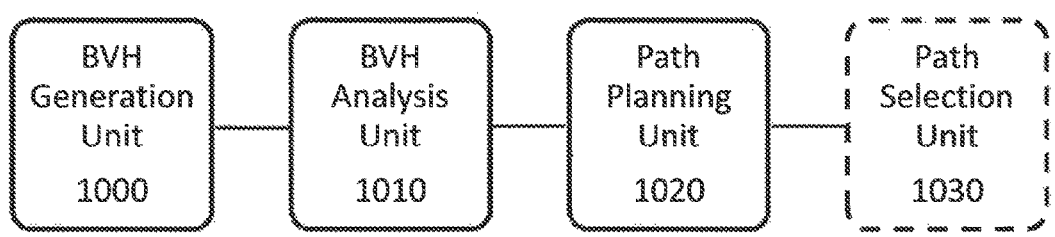
FIG. 10 schematically illustrates a system for generating a path for navigating an environment.

FIG. 10 schematically illustrates a system for generating a path for navigating an environment. This system comprises a BVH generation unit 1000, a BVH analysis unit 1010, a path planning unit 1020, and (optionally) a path selection unit 1030. As discussed above, the environment may be a real environment, a virtual environment, or comprise elements of both.

The BVH generation unit 1000 is operable to generate a BVH comprising a plurality of bounding volumes representing one or more objects in the environment. In some embodiments, the BVH generation unit 1000 is operable to generate the BVH such that it is also able to be used for a raytracing process; of course, in other embodiments, it is considered that a separate BVH may be used for the raytracing process.

If the BVH generation unit 1000 is operable to generate the BVH for dual-use, a number of configurations are possible. In some embodiments, the BVH generation unit 1000 is operable to generate a BVH comprising separate trees for each of the respective uses. The BVH generation unit 1000 may also (or alternatively) be operable to assign flags to one or more bounding volumes or BVH levels to indicate use for generating a path and/or raytracing.

As discussed above, in some embodiments it is considered advantageous if the BVH generation unit 1000 is operable to generate a bounding volume representing a destination in the environment that does not correspond to an object in the environment. Such a bounding volume would appear to be 'invisible' or non-existent for the purpose of raytracing, and used only for path planning.

In embodiments in which it is a real environment that is to be navigated using a generated path, it is considered that the BVH generation unit 1000 may be operable to generate the BVH in dependence upon image and/or sensor data indicating one or more real-world properties. For example, images of the environment may be used to generate a map of the environment, and subsequently used to generate bounding volumes to populate the BVH. Similarly, other sensor inputs may be considered such as depth sensors or the like.

The BVH analysis unit 1010 is operable to identify information about the geometry of the environment from the BVH. That is, the BVH analysis unit 1010 is operable to identify one or more properties of the environment from the BVH. This may comprise the BVH analysis unit 1010 being operable to select bounding volumes from one or more BVH levels for identifying information about the geometry, wherein the BVH analysis unit 1010 is operable to determine the levels in dependence upon one or more characteristics of the environment or in dependence upon one or more characteristics of the navigation to be performed.

In some embodiments, the BVH analysis unit 1010 is operable to utilise information relating to the BVH traversal during raytracing for path planning, and/or is operable to output information about BVH traversal during path planning for use during raytracing.

The path planning unit 1020 is operable to generate one or more paths through the environment in dependence upon the identified geometry. That is, in some embodiments the path planning unit 1020 is operable to generate a single path through the environment, while in other embodiments (or in other circumstances in the same embodiments) the path planning unit 1020 is operable to generate a plurality of candidate paths to be selected from.

The path planning may be performed in a number of suitable manners, given suitable input information. Many suitable techniques have been explored in both computer games and robotics fields; these may be adapted where appropriate for a given implementation.

Planning the path requires a start position for the path (such as a character or object location), and an end position. In some embodiments, numerous end positions may be generated to represent different objectives; in some cases, a series of end positions may be generated to represent an intended path with several intermediate locations (such as checkpoints).

These end positions may be a defined target location (such as a door to move to a next room in the environment, or the finish line in a race), or it may be defined more generally in a goal-oriented way using one or more conditions or rules to identify suitable target locations. For instance, the end position may be defined as 'reach a threshold altitude', 'travel a particular distance', 'be near to/far from a particular object/element', or 'obtain a particular viewpoint'. Numerous end position conditions may be defined in combination, to generate a complex end point definition.

In some cases, the start position may be similarly defined; this may be appropriate if the start position is not well-defined (such as a user being able to select a spawn point for their avatar within an area). Similarly, in some cases it may be appropriate to work backwards from the end position to identify a suitable start position (such as when solving a maze, to provide a simple example). In such cases, one or more conditions or rules may be associated with the start position (such as 'outside the maze') that constrain the path generation process. In such cases it is considered that the expected direction of travel defines the 'start' and 'end' definitions of the route; the definition of 'start' and 'end' is therefore not an arbitrary designation.

Given a start and end position for the path, however they are defined, processing can be performed to identify one or more paths that satisfy both of these conditions (that is, paths that have a start and an end position that are considered to match the definition of the start and end positions). These one or more paths are generated using the identified geometry information and one or more rules relating to the environment or an object to take the path (such as jumping ability, or object size). Given these constraints, there are numerous ways to go about the path generation process.

One example of such a process is that of identifying any route between the start and end positions that leads to a complete path with no interruptions; this may be performed using a trial and error style processing, or a more stochastic approach, for example. In some cases, candidate paths may be explored using a goal-oriented virtual robot or the like that is programmed (for example, using a machine learning agent in a reinforcement learning implementation) to identify suitable paths. Of course, a multi-stage processing may be performed to generate paths as in some cases this may lead to a more efficient implementation. These paths may be generated with the environmental considerations (such as object size), or these considerations may be used to evaluate and selectively discard paths after the generation.

One exemplary method for path planning is that of a 'random walk', in which an object is generated at the start position and random steps (changes in position) are implemented. This process may be continued until the end position is reached, or until a threshold number of steps has been taken. The results of either of these may be used as the basis for generated refined paths to increase the efficiency of the path (that is, reduce the number of steps required to reach the end position). These steps may be constrained by the identified geometry, such that the random steps are confined to areas in which the object or character that would later use the path are also confined to.

In another example, a similar approach may be taken using cast rays from the start position, and using reflections upon interaction with bounding volumes to navigate around obstacles and the like. One example of such a method is discussed with reference to FIG. 6 above.

It is considered that the manner in which the paths are generated is able to be selected freely, so long as the paths are generated based upon the geometric information that is derived from the BVH analysis unit 1010 as described above.

The path selection unit 1030 is operable to select a path for navigation from amongst the plurality of candidate paths in dependence upon one or more predefined rules, in the case that the path planning unit 1020 is operable to generate a plurality of candidate paths. That is, the path selection unit 1030 is configured to select a preferred path from amongst two or more candidate paths generated by the path planning unit 1020 in embodiments in which the path planning unit 1020 generates multiple candidate paths.

These predefined rules may be selected freely so as to correctly constrain the path for the intended application. For example, when considering finding a path for navigating a real-world environment the rules may relate to laws of physics or the like so as to ensure that the determined path is physically able to be navigated along. Alternatively, or in addition, the rules may relate to game conditions or the like—for example, paths may be evaluated with respect to in-game scoring or virtual obstacles (including barriers or opponents, for example). Of course, in some cases the rules may be even simpler—the paths may be evaluated in dependence upon the total path length or expected duration of travel time associated with a path (these may differ with varying terrain, of course).

The arrangement of FIG. 10 is an example of a processor (for example, a GPU and/or CPU located in a games console or any other computing device) that is operable to generate paths for navigating an environment, and in particular is operable to:

generate a BVH comprising a plurality of bounding volumes representing one or more objects in the environment;

identify information about the geometry of the environment from the BVH; and generate a path through the environment in dependence upon the identified geometry.

Figure 11:
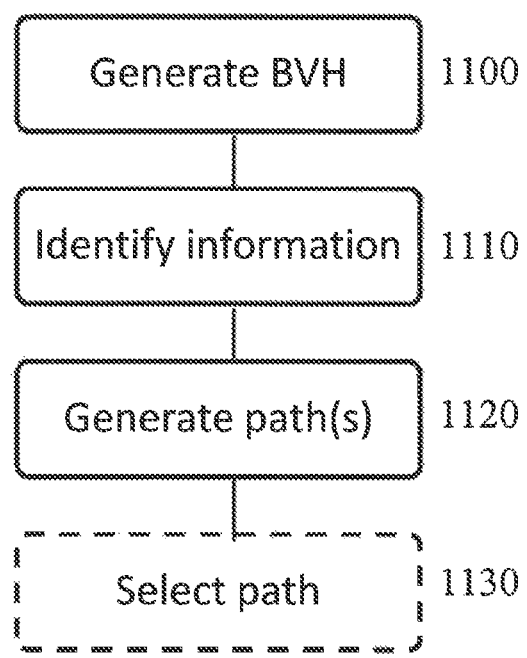
FIG. 11 schematically illustrates a method for generating a path for navigating an environment.

FIG. 11 schematically illustrates a method for generating a path for navigating an environment.

A step 1100 comprises generating a bounding volume hierarchy, BVH, comprising a plurality of bounding volumes representing one or more objects in the environment.

A step 1110 comprises identifying information about the geometry of the environment from the BVH.

A step 1120 comprises generating one or more paths through the environment in dependence upon the identified geometry.

An optional step 1130 comprises selecting a path for navigation from amongst the plurality of candidate paths in dependence upon one or more predefined rules, in the case that multiple paths are generated in step 1120.

As described above, such a method may provide a path planning method that may be more efficient and/or effective than existing path planning methods. The disclosed methods utilise bounding volume hierarchies that are often associated with raytracing techniques; this can result in a further improved processing speed due to the presence of specialised hardware support for these features in a number of processing devices.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for generating a path for navigating an environment, the system comprising:
   a bounding volume hierarchy, BVH, generation unit operable to generate a BVH comprising a plurality of bounding volumes representing one or more objects in the environment;
   a BVH analysis unit operable to identify information about the geometry of the environment from the BVH; and
   a path planning unit operable to generate a path through the environment in dependence upon the identified geometry; wherein
   the BVH analysis unit and the path planning unit operate to select bounding volumes from one or more BVH levels for identifying information about the geometry, and determine from which BVH levels bounding volumes are to be selected in dependence upon one or more characteristics of the environment, such that a bounding volume corresponding to a destination position within the environment is reduced, or a different BVH level is selected, as a navigating object approaches the destination position,
   the BVH generation unit is operable to generate the BVH such that: (i) the BVH is able to be used for a raytracing process, and (ii) the BVH comprises separate branches and/or sub-trees for each of the respective uses.

2. The system of claim 1, wherein the BVH generation unit is operable to assign flags to one or more bounding volumes or BVH levels to indicate use for generating a path and/or raytracing.

3. The system of claim 1, wherein the BVH analysis unit is operable to utilise information relating to the BVH traversal during raytracing for path planning, and/or is operable to output information about BVH traversal during path planning for use during raytracing.

4. The system of claim 1, wherein the BVH analysis unit is operable to determine the levels in dependence upon one or more characteristics of the navigation to be performed.

5. The system of claim 1, wherein the BVH generation unit is operable to generate a bounding volume representing a destination in the environment that does not correspond to an object in the environment.

6. The system of claim 1,
   wherein the path planning unit is operable to generate a plurality of candidate paths, and
   wherein the system comprises a path selection unit operable to select a path for navigation from amongst the plurality of candidate paths in dependence upon one or more predefined rules.

7. The system of claim 1, wherein the environment is a real environment, a virtual environment, or comprises elements of both.

8. The system of claim 7, wherein the BVH generation unit is operable to generate the BVH in dependence upon image and/or sensor data indicating one or more real-world properties.

9. The system of claim 1, wherein the one or more characteristics include one or more of a rule relating to the environment and a rule relating to an object to take the path.

10. A method for generating a path for navigating an environment, the method comprising:
    generating a bounding volume hierarchy, BVH, comprising a plurality of bounding volumes representing one or more objects in the environment;
    identifying information about the geometry of the environment from the BVH; and
    generating a path through the environment in dependence upon the identified geometry; wherein the identifying information and the generating a path include selecting bounding volumes from one or more BVH levels for identifying information about the geometry, and determining from which BVH levels bounding volumes are to be selected in dependence upon one or more characteristics of the environment, such that a bounding volume corresponding to a destination position within the environment is reduced, or a different BVH level is selected, as a navigating object approaches the destination position,
    wherein the BVH is generated such that: (i) the BVH is able to be used for a raytracing process, and (ii) the BVH comprises separate branches and/or sub-trees for each of the respective uses.

11. A non-transitory machine-readable storage medium which stores computer software which, when executed by a computer, causes the computer to perform a method for generating a path for navigating an environment, the method comprising:
- generating a bounding volume hierarchy, BVH, comprising a plurality of bounding volumes representing one or more objects in the environment;
- identifying information about the geometry of the environment from the BVH; and
- generating a path through the environment in dependence upon the identified geometry;
- wherein the identifying information and the generating a path include selecting bounding volumes from one or more BVH levels for identifying information about the geometry, and determining from which BVH levels bounding volumes are to be selected in dependence upon one or more characteristics of the environment, such that a bounding volume corresponding to a destination position within the environment is reduced, or a different BVH level is selected, as a navigating object approaches the destination position,
- wherein the BVH is generated such that: (i) the BVH is able to be used for a raytracing process, and (ii) the BVH comprises separate branches and/or sub-trees for each of the respective uses.

* * * * *